(12) United States Patent
Kawashima et al.

(10) Patent No.: US 6,886,084 B2
(45) Date of Patent: Apr. 26, 2005

(54) STORAGE CONTROLLING DEVICE AND CONTROL METHOD FOR A STORAGE CONTROLLING DEVICE

(75) Inventors: Akira Kawashima, Yokohama (JP); Homare Kanie, Yokohama (JP); Hitoshi Arai, Yokohama (JP); Nobuyuki Oka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 10/371,545

(22) Filed: Feb. 20, 2003

(65) Prior Publication Data

US 2004/0006604 A1 Jan. 8, 2004

(30) Foreign Application Priority Data

Jul. 5, 2002 (JP) ........................................ 2002-197366

(51) Int. Cl.[7] .......................... G06F 15/16; G06F 13/00
(52) U.S. Cl. .................... 711/158; 711/151; 711/154
(58) Field of Search ............................... 709/200, 203, 709/213; 711/100, 111, 112, 151, 154, 158; 710/1, 36

(56) References Cited

U.S. PATENT DOCUMENTS

| | | | | | |
|---|---|---|---|---|---|
| 5,778,165 | A | * | 7/1998 | Saxon | 714/4 |
| 5,845,076 | A | * | 12/1998 | Arakawa | 709/203 |
| 5,875,479 | A | * | 2/1999 | Blount et al. | 711/162 |
| 5,909,700 | A | * | 6/1999 | Bitner et al. | 711/162 |
| 6,269,382 | B1 | * | 7/2001 | Cabrera et al. | 707/204 |
| 6,728,849 | B2 | * | 4/2004 | Kodama | 711/162 |

* cited by examiner

*Primary Examiner*—Tuan V. Thai
(74) *Attorney, Agent, or Firm*—Townsend and Townsend and Crew LLP

(57) ABSTRACT

A storage controlling device is connected to an external device and is able to communicate with each other. The storage controlling device may send/receive data input/output requests to/from the external device, and may execute data input/output processes in response to the data input/output requests. The input/output processes are executed in response to the data input/output requests attached to priority level determining information in an order that is determined based on priority level determining information that is attached as attribute information of the data input/output requests received from the external device.

7 Claims, 6 Drawing Sheets

FIG.2

| LUN | a | b | c | d | e | f | g |
|---|---|---|---|---|---|---|---|
| PRIORITY LEVEL | 10 | 9 | 8 | 7 | 6 | 4 | 1 |

FIG.3

| PRIOLITY LEVEL | 10 | 9 | 8 | 7 | 6 | 5 | 4 | 3 | 2 | 1 |
|---|---|---|---|---|---|---|---|---|---|---|
| MAXIMAM NUMBER | 19 | 17 | 15 | 13 | 11 | 9 | 7 | 5 | 3 | 1 |

FIG.5

| | LUN | a | b | c | d | e | f | g |
|---|---|---|---|---|---|---|---|---|
| PRIORITY LEVEL | WRITING | 10 | 10 | 5 | 5 | 2 | 2 | 2 |
| | READING | 10 | 2 | 10 | 2 | 10 | 5 | 1 |

STORAGE CONTROLLING DEVICE AND CONTROL METHOD FOR A STORAGE CONTROLLING DEVICE

CROSS-REFERENCE TO RELATED APPLICATIONS

The present application claims priority upon Japanese Patent Application No. 2002-197366 filed on Jul. 5, 2002, which is herein incorporated by reference.

BACKGROUND OF THE INVENTION

The present invention relates to a storage controlling device and a control method for a storage controlling device.

With development of IT-related industries, the demand for data storage is rising sharply. In so-called data centers in which backbone systems and web servers and the like are operated, large numbers of disk array systems connected to, for example, SANs (storage area networks) and LANs (local area networks) are introduced and operated. And also the needs of customers using the disk array systems operated in such data centers or the like become increasingly diversified.

In ordinary data centers or the like, due to the introduction of subsequent models, a variety of storage resources, such as disk array systems, network devices or peripheral devices, with different capacity and performance are operated. Therefore, the performance of a storage resource that is provided to the customer differs depending on the model on which that storage resource is provided, and thus also the quality of the service provided to the customer varies.

On the other hand, seen from the viewpoint of the customer, it is sufficient only if necessary and adequate storage resources are secured in accordance with the customer's financial or economic potential, and it is advantageous if those can be used at the lowest cost possible. For example, the data handled by the customer may or may not be data for which real-time processing is more important than for other data so that it is not necessary to use more costly and highly advanced storage resources to process all data. That is to say, the customer will ordinarily want to utilize resources in a necessary minimum form that complies as much as possible with the customer's present and future needs.

SUMMARY OF INVENTION

The present invention has been made from this point of view, and its object is to provide a storage controlling device which functions purposively and effectively.

In order to achieve the above-mentioned object, a storage controlling device in accordance with a main aspect of the present invention being connected to an external device and being able to communicate with each other comprises storage means, means for sending/receiving data input/output requests to/from the external device, and execution means for executing data input/output processes with respect to the storage means in response to the data input/output requests in an order that is determined based on priority level determining information that is attached as attribute information of the data input/output requests received from the external device.

BRIEF DESCRIPTION OF THE DRAWINGS

FIG. 2 shows a priority level administration table in an embodiment of the present invention;

FIG. 3 shows a processing proportion administration table in an embodiment of the present invention;

FIG. 5 shows a priority level administration table in another embodiment of the present invention.

DETAILED DESCRIPTION OF THE PREFERRED EMBODIMENTS

Outline of the Disclosure

Figure 1:
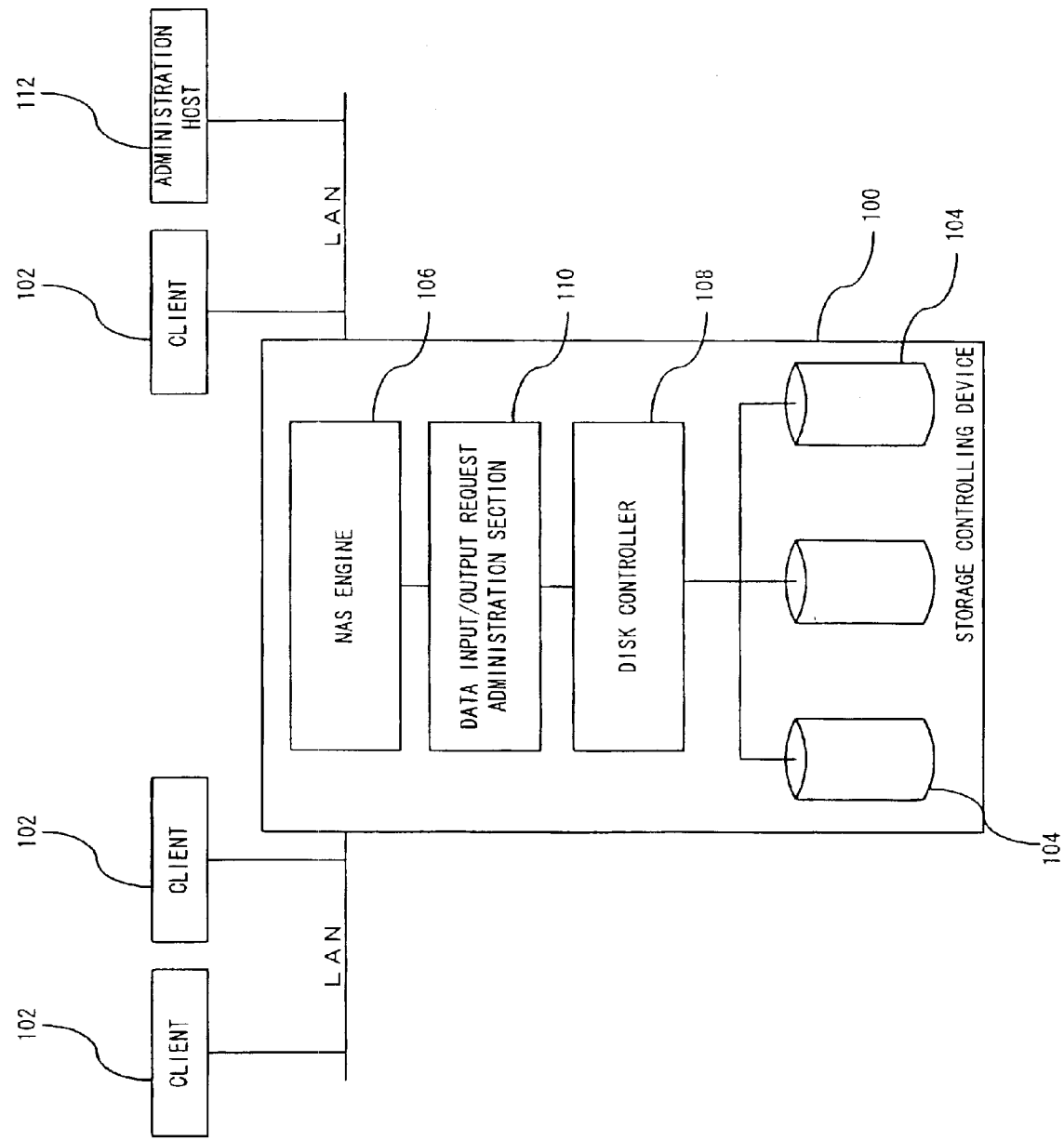
FIG. 1 shows the overall configuration of a storage controlling device in an embodiment of the present invention.

At least the following matters will be made clear by the explanation in the present specification and the description of the accompanying drawings.

A storage controlling-device in accordance with a main aspect of the present invention being connected to an external device and being able to communicate with each other comprises storage means, means for sending/receiving data input/output requests to/from the external device, and execution means for executing data input/output processes with respect to the storage means in response to the data input/output requests in an order that is determined based on priority level determining information that is attached as attribute information of the data input/output requests received from the external device.

With this configuration, the storage controlling device can get the priority level of the data that is input or output by simply consulting the priority level determining information attached to the data input/output requests, the order for the data input or output can be determined based thereupon, and in accordance with this order, the data can be input or output with respect to the storage system. Consequently, with this invention, the storage controlling device can determine the order of the data input/output requests for each client or for each type of disk drive, and it becomes possible to provide a storage controlling device that can function purposively and effectively.

Furthermore, priority levels corresponding to the priority level determining information may be attached to the received data input/output requests, and the data input/output processes corresponding to the data input/output requests of each of the priority levels may be executed at least once every time the data input/output processes are executed a preset number of times. Thus, when the execution order of the data input/output processes is determined based on the priority level determining information, it is possible to avoid problems that the data input/output processes with a low priority level determining information are always postponed and those data input/output processes are not executed for a long time.

Furthermore, a priority level administration table may be stored that associates the priority level determining information with the priority levels with which the execution means executes the data input/output requests, and the order in which the execution means execute the data input/output processes corresponding to the data input/output requests may be decided based on the priority level administration table. Thus, the priority level determining information and the priority levels can be handled independently, and for example priority levels for writing requests and priority levels for reading requests can be set independently with regard to one set of priority level determining information, allowing more detailed settings for the priority levels.

Furthermore, priority levels corresponding to the priority level determining information may be attached to the received data input/output requests, and the data input/output processes corresponding to the data input/output requests of each of the priority levels may be executed at least once every time the data input/output processes are executed a preset number of times. Thus, when the execution order of the data input/output processes is determined based on the priority level determining information, it is possible to avoid problems that the data input/output processes with a low priority level determining information are always postponed and those data input/output processes are not executed for a long time.

Furthermore, the priority level determining information may specify the storage means on which the input/output processes corresponding to the data input/output requests are executed.

Furthermore, the storage means may be at least one disk drive, and the priority level determining information may specify storage regions that are logically set on storage regions of those disk drives.

Furthermore, the priority level determining information may specify the external device that has sent the data input/output request.

Furthermore, the storage controlling device may further comprise means for sending/receiving the priority level administration table to/from the external device. Thus, it becomes possible to associate the priority level determining information in the priority level administration table with the priority levels from the external device.

Furthermore, the storage controlling device may further comprise means for receiving data input/output requests that comply a protocol specifying, with a file name, the data to be processed in the data input/output process.

Moreover, in a control method for a storage controlling device being connected to an external device and being able to communicate with each other and comprising storage, sending/receiving unit for sending/receiving data input/output requests to/from the external device, and storage controlling device for executing data input/output processes with respect to the storage in response to the data input/output requests, the storage controlling device may execute the data input/output processes in response to the data input/output requests in an order that is determined based on priority level determining information that is attached as attribute information of the data input/output requests received from the external device.

Moreover, it is also possible to execute on the external device in the control method for the storage controlling device a program for executing means for setting an association between the priority level determining information and the priority levels with which the execution means executes the data input/output requests, and means for sending the association that has been set to the storage controlling device.

Embodiments

The following is a detailed description of the present invention, with reference to the drawings.

FIG. 1 shows a storage system in accordance with an embodiment of the present invention.

In FIG. 1, a disk array system serving as an example of a storage controlling device 100 in accordance with the present invention is provided with processing function of an NFS (network file system) protocol for receiving data input/output requests for specified file names from clients 102, which are external devices. This type of disk array system is commonly called NAS (network attached storage).

The storage controlling device 100 is connected to the clients 102 so that communication is possible, and includes a plurality of disk drives 104 as storage means, an NAS engine 106 providing means (or unit) for sending/receiving data by NFS, and a disk controller 108 as execution means for inputting/outputting data into/from the disk drives 104.

Furthermore, the storage controlling device 100 also includes a processing queue (not shown in the drawings; referred to as "queue" below) in which data input/output requests that are sent by the clients 102 and received by the NAS engine 106 are registered, and a data input/output request administration section 110 that determines for example the processing order of the data input/output requests in the queue. The storage controlling device 100 sets up "logical units" (referred to as "LU" below), which are logical storage regions in the storage regions provided by the disk drives 104. Unique logical unit numbers (referred to as "LUN" below) a to g are assigned to these logical units.

The storage controlling device 100 stores a priority level administration table (for example, FIG. 2 or FIG. 5), in which priority level determining information that is attached as attributes to the data input/output requests is associated with priority level in actually processing. Here, "priority level" is determined in accordance with the priority level determining information, and is the information that the storage controlling device 100 looks up when deciding the execution order of the data input/output processing in response to data input/output requests. In principle, the storage controlling device 100 processes those data input/output requests that have a higher priority level first. Furthermore, in case of the same priority level, the data input/output request that was received first is processed first.

The storage controlling device 100 also stores a processing proportion administration table (for example FIG. 3). In this table, the maximum number of successive processes of data input/output requests of the disk controller 108 is set for each priority level. For example, when the maximum number of successive data input/output requests of a certain priority level has been processed, then the data input/output requests of the next highest priority level are processed even if there are data input/output requests of the current priority level left. Processing continues to the data input/output requests with the lowest priority level, and then the data input/output requests with the first priority level are processed again.

The following is a more detailed explanation of several processes for specific data input/output requests performed on this storage controlling device 100.

WORKING EXAMPLE 1

Figure 2:
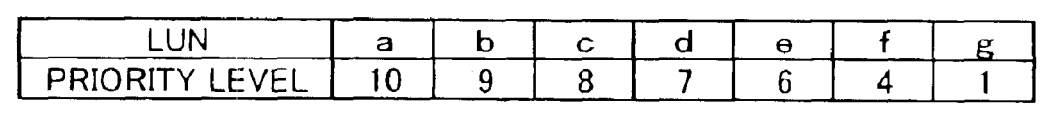

In this working example, one priority level is set for the priority level determining information attached to the data input/output requests sent from the external devices 102. FIG. 2 shows an example of a priority level administration table for the case that the priority level determining information is the LUN. In this table, the processing performance of LUN "a" is the highest, and consequently, the data of the highest importance or urgency are stored on the LUN "a." As the LUN names proceed alphabetically, the processing performance of the LUs decreases, and data of the lowest importance or urgency is set to be stored on the LUN "g." It should be noted that this processing performance of the LUs is determined for example depending on what kind of performance is selected for the disk drive providing the LU.

There are ten levels, 1 through 10, of priority (a larger number means a higher priority), and a priority level is assigned to each LUN. Furthermore, the storage controlling device 100 stores the processing proportion administration table shown in FIG. 3. In this table, the maximum number of successive processes of data input/output processes of the disk controller 108 is set for each priority level.

The content of the priority level administration table and the processing proportion administration table is determined, for example, by an administration host 112, which is one of the external devices. By setting these tables, the company operating the storage controlling device 100 can for example provide the service that the processing priority level of the data entrusted by its customers is varied depending on the usage fees for the customers. Thus, the customers utilizing the storage controlling device 100 can select a service fulfilling their purpose, in view of the rapidity and importance of the data stored in the storage controlling device 100 as well as from the customer's economic viewpoint.

Furthermore, it is also possible to make these tables settable from a client, for example from a user terminal. Thus, customers using the storage controlling device 100 at a data center or the like can set the content of the tables quickly and easily at a time of their convenience, without going, for example, through an operator or the company operating the storage controlling device 100. Furthermore, if the customer wants to confirm the settings in which the storage controlling device 100 is used, then it is easy to look up the content of the tables from a user terminal or client.

In a storage controlling device 100 with this configuration, when a data input/output request specifying a LUN is sent from a client 102, the NAS engine 106 receives it, and sends it to the data input/output request administration section 110. The data input/output request administration section 110 registers the received data input/output request in a queue in which data input/output requests are stored.

Next, by looking up the priority level administration table, the data input/output request administration section 110 acquires the priority level corresponding to the LU serving as the storage destination of the data input/output request, and based on the processing proportion administration table, a data input/output request is selected from the data input/output requests registered in the queue.

Figure 4:
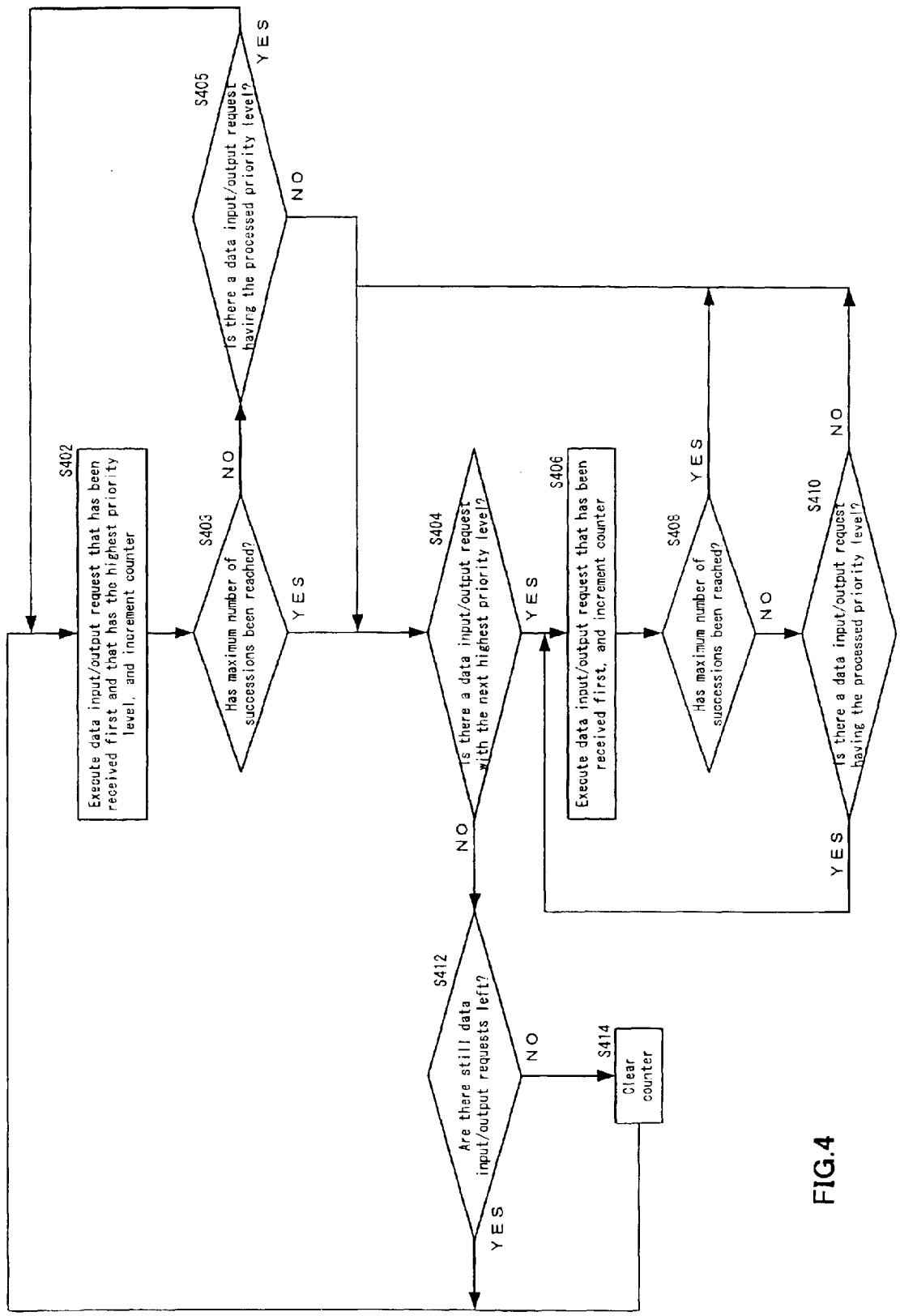
FIG. 4 shows a flowchart illustrating the operation of the storage controlling device when executing a data input/output request in an embodiment of the present invention.

This selection is carried out in the order of the flowchart of FIG. 4. When the storage controlling device 100 executes the data input/output request that have the highest priority in the queue, the counter of that priority level is incremented by one (s402). When the incremented counter reaches the maximum number of successive processes for that priority level as shown in the processing proportion administration table (s403–s404), even if there are still data input/output requests of the current priority left, then the data input/output request of the next highest priority is executed and the counter of that priority is incremented by one (s404–s406). Then, data input/output requests having that priority are executed until the counter reaches the maximum number of successive processes for that priority level (s406–s408–s410). When the counter of that priority level has reached the maximum number of successive processes, even if there are still data input/output requests of the current priority level left, then the data input/output requests of the next highest priority is executed and the counter of that priority is incremented by one (s408–s404–s406). If the data input/output requests for a certain priority level are all executed without reaching the maximum number of successive processes for that priority level, then at that point the data input/output request of the next highest priority level is executed (s408–s410–s404–s406).

Thus, when the processing from the data input/output requests with the highest priority to the data input/output requests with the lowest priority has finished, then the data input/output requests with the highest priority level are processed again (s404–s412–s402). When the cycle of executing the priority level data input/output requests in order has been executed for all data input/output requests, and there are no more data input/output requests left in the queue, the counter is cleared (s412–s414).

As explained above, the disk controller 108 executes in order the data input/output requests for the disk drives 104 in the queue.

WORKING EXAMPLE 2

In Working Example 1, one priority level was associated with each priority level determining information attached as an attribute of the data input/output request. In the working example explained in the following, plural priority levels are associated with a priority level determining information, depending on the processing that is requested by the data input/output request.

The storage controlling device 100 stores a priority level administration table as shown in FIG. 5. In this table, priority levels for writing and reading are independently set for each LUN. Moreover, the storage controlling device 100 stores the processing proportion administration table shown in FIG. 3, in which the maximum number of successive processes of data input/output requests of the disk controller 108 is set for each priority level.

The storage controlling device 100 determines the order of write processes (or read processes) for write requests (or read requests) sent from the clients, using the priority level administration table and the processing proportion administration table. It should be noted that in this working example, the processing, after the write requests (or read requests) to which priority level information is attached have been sent from the clients to the storage controlling device 100 and until the disk controller 108 executes the write requests (or read requests), is similar to Working Example 1, except for the type of priority level administration table, so that explanations on this process is omitted here.

With this working example, it is, for example, possible to set different priority levels for write requests and read requests. Consequently, if more urgency is placed on a writing process than on a reading process, as for a data backup process for example, then the utilization efficiency of the entire storage controlling device 100 can be improved by increasing the priority level of writing processes beyond that of reading processes with respect to directories for backups.

WORKING EXAMPLE 3

Figure 6:
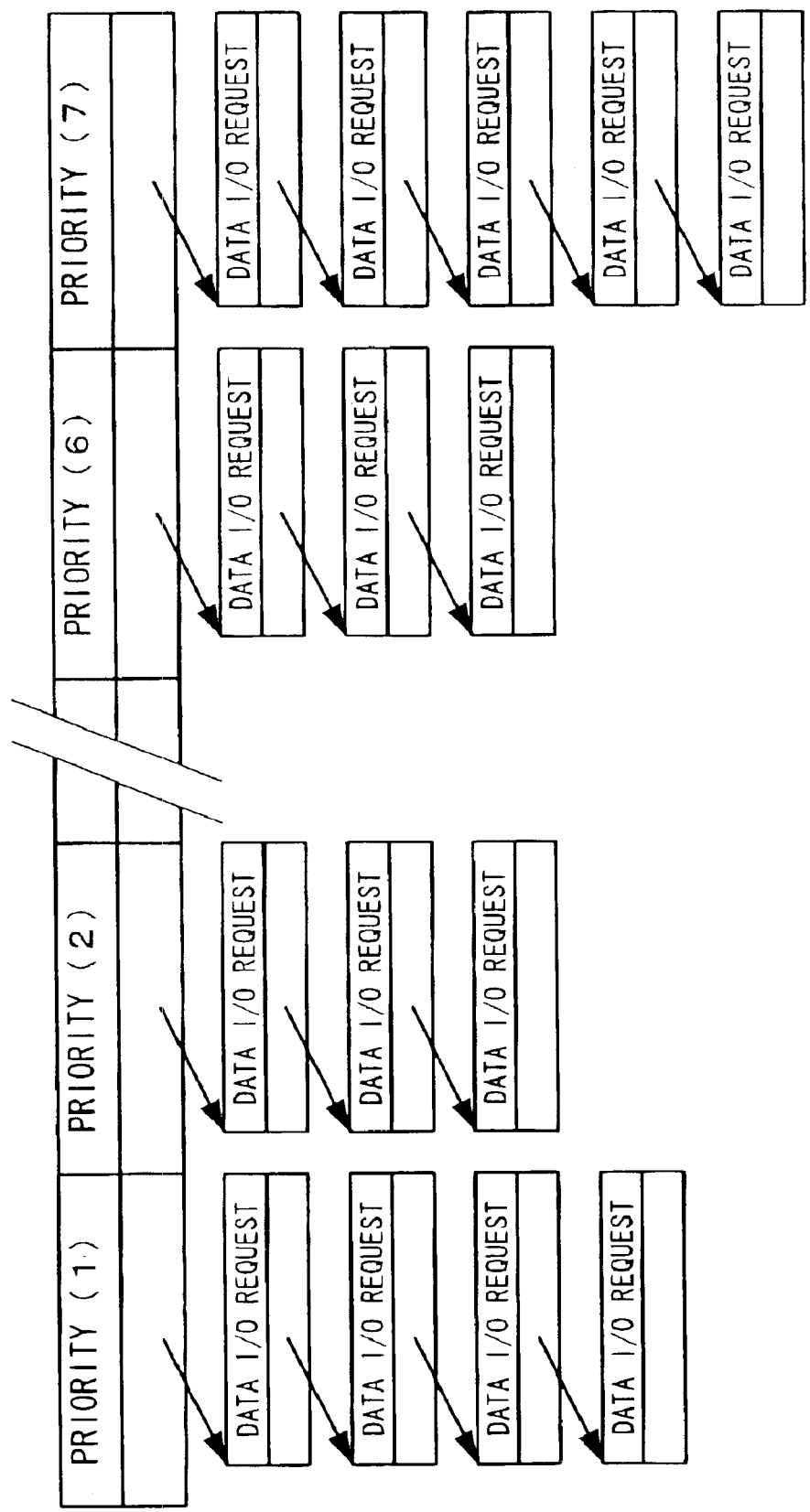
FIG. 6 shows a data input/output administration table in an embodiment of the present invention.

In Working Examples 1 and 2, when a data input/output request with a specified LUN is sent from a client 102 to the storage controlling device 100, the storage controlling device 100 registers this data input/output request in the queue, and for the execution of the data input/output requests, determines the processing order by selecting a data input/output request. In this working example, on the other hand, a data input/output administration table as shown in FIG. 6 is provided in the data input/output request administration section 110, in addition to the priority level administration table and the processing proportion administration table.

When the NAS engine 106 of the storage controlling device 100 receives a data input/output request with a specified LUN sent from a client 102, then it sends that data input/output request to the data input/output request administration section 110. The data input/output request administration section 110 writes the sent data input/output request into the data input/output administration table. Thus, data input/output requests are registered in the data input/output administration table, classified by priority level.

Then, the data input/output administration section 110 executes the data input/output requests with the same method as in Working Example 1, based on the priority level administration table and the processing proportion administration table.

Other Embodiments

In Working Example 1, since the priority level determining information corresponds to the priority level, the correspondence between priority level determining information and priority levels is set in advance, and if it is not necessary to change the settings, then the priority level administration table does not necessarily have to be provided. It is also possible that every time an input/output request is sent, the storage controlling device 100 registers the input/output request directly in the processing queue, and executes the data input/output request by recognizing the priority level determining information.

In Working Example 3, the data input/output request administration section 110 may also be provided with a processing queue for each of the priority levels, instead of executing the data input/output requests from a single queue.

Furthermore, it is also possible to associate the priority level with information specified by the client. In that case, it is possible to arrange several levels for the usage fee of the storage controlling device 100, and to provide a service so that the data input/output requests from the clients of customers paying a high usage fee are processed preferentially.

Thus, with the present invention, a storage controlling device is provided that functions purposively and effectively.

What is claimed is:

1. A storage controlling device connected to an external device and being able to communicate with each other, comprising:

storage means for storing data;

means for sending/receiving data input/output requests to/from said external device;

execution means for executing data input/output processes with respect to said storage means in response to said data input/output requests in an order that is determined based on priority level determining information that is attached as attribute information of said data input/output requests received from said external device; and a priority level administration means for storing a maximum number of successive processes of data input/output requests for each priority levels, and for associating said priority level determining information with an execution order priority level;

wherein priority levels corresponding to said priority level determining information are provided to said received data input/output requests, and said data input/output processes corresponding to said data input/output requests at each of said priority levels are executed at least once every time said data input/output processes are executed a preset number of times.

2. A storage controlling device connected to an external device and being able to communicate with each other, comprising:

storage means for storing data;

means for sending/receiving data input/output requests to/from said external device; and execution means for executing data input/output processes with respect to said storage means in response to said data input/output requests based on priority level determining information that is attached as an attribute information of said data input/output requests received from said external device, wherein a priority level administration table is used to associate said priority level determining information with an execution order priority level, wherein the order in which said execution means execute said data input/output processes corresponding to said data input/output requests is determined based on the execution order priority level stored in said priority level administration table, wherein said priority level administration table also stores a maximum number of successive processes of data input/output requests for each priority levels, and the data input/output processes corresponding to said data input/output requests at each of said priority levels are executed at least once every time said data input/output processes are executed a preset number of times.

3. The storage controlling device according to claim 2, wherein said priority level determining information specifies the storage means on which the input/output processes corresponding to said data input/output requests are executed.

4. The storage controlling device according to claim 2, wherein said storage means is at least one disk drive, and wherein said priority level determining information specifies storage regions that are logically set on storage regions of those disk drives.

5. The storage controlling device according to claim 2, wherein said priority level determining information specifies the external device that has sent said data input/output request.

6. The storage controlling device according to claim 2, further comprising means for sending/receiving said priority level administration table to/from said external device.

7. The storage controlling device according to claim 2, further comprising means for receiving data input/output requests that comply a protocol specifying, by use of a file name, the data to be processed in said data input/output process.

* * * * *